United States Patent
Yano et al.

(10) Patent No.: US 7,728,556 B2
(45) Date of Patent: Jun. 1, 2010

(54) SEMICONDUCTOR DEVICE FOR PROTECTING RECHARGEABLE BATTERY

(75) Inventors: Koichi Yano, Kanagawa (JP); Akihiko Fujiwara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 269 days.

(21) Appl. No.: 11/496,863

(22) Filed: Jul. 31, 2006

(65) Prior Publication Data

US 2007/0030614 A1 Feb. 8, 2007

(30) Foreign Application Priority Data

Aug. 8, 2005 (JP) .............................. 2005-230151

(51) Int. Cl.
*H02J 7/00* (2006.01)
(52) U.S. Cl. ..................... 320/134; 320/135; 320/136
(58) Field of Classification Search .......... 320/134–136
See application file for complete search history.

(56) References Cited

U.S. PATENT DOCUMENTS

2002/0050806 A1* 5/2002 Fujiwara ..................... 320/136
2003/0137883 A1* 7/2003 Chun ..................... 365/189.11
2005/0068008 A1* 3/2005 Zhang .......................... 320/134

FOREIGN PATENT DOCUMENTS

| JP | 2002-176730 | 6/2002 |
|----|-------------|--------|
| JP | 2002-186173 | 6/2002 |
| JP | 3597618 | 9/2004 |
| JP | 2005-12852 | 1/2005 |

* cited by examiner

*Primary Examiner*—Edward Tso
*Assistant Examiner*—Samuel Berhanu
(74) *Attorney, Agent, or Firm*—Cooper & Dunham LLP

(57) ABSTRACT

A semiconductor device for protecting a rechargeable cell at least from excessive discharge current due to over discharge of the rechargeable cell, includes (a) a first excessive discharge current detection circuit configured to detect first excess of a voltage at an electric current detection terminal exceeding a first voltage level (Vs3), (b) a second excessive discharge current detection circuit configured to detect second excess of the absolute voltage at the electric current detection terminal exceeding a second voltage level (Vs4) higher than the first voltage level, (c) a delay circuit configured to cause each of the first and second excessive discharge current detection circuits to delay output by a predetermined delay time, and (d) a delay reducing circuit configured to produce a delay time reducing signal for reducing the delay time at a predetermined ratio.

8 Claims, 3 Drawing Sheets

SEMICONDUCTOR DEVICE FOR PROTECTING RECHARGEABLE BATTERY

BACKGROUND

1. Technical Field

This disclosure relates to a semiconductor device for protecting a rechargeable battery, and more particularly, to a protection IC for protecting a lithium-ion cell accommodated in a rechargeable battery pack used for portable electronic devices from overcharge, over discharge, excessive charging or discharge current, or short-circuit current.

2. Description of Related Art

Conventionally, easy-handling battery packs have been in widespread use for power sources of portable electronic devices. A battery pack is comprised of one or more secondary (rechargeable) cells accommodated in a package. Secondary cells are in general high-capacity battery cells, such as lithium-ion cells, lithium polymer batteries, or nickel hydride batteries. Because the amount of energy held inside a high-capacity battery cell is very large, intense heat is likely to be produced by overcharge, over discharge or overcurrent, which intense heat may causes fire.

To avoid such undesirable situations, a protection IC or semiconductor device is provided in the battery pack for the purpose of protecting the rechargeable cell from overcharge, over discharge, excessive charging or discharge current, short-circuit current, etc. When it becomes necessary to protect the rechargeable cell, the rechargeable cell is electrically disconnected from the battery charger or load regulator to prevent undesirable heat generation or fire.

The protection IC includes detection circuits, each of which is provided for detecting one of overcharge, over discharge, excessive charging current, excessive discharge current, and short-circuit current. When any one of the detection circuits detects an abnormal situation that requires a protecting operation, it outputs a detection signal to open the switch arranged between the rechargeable cell and the battery charger/load regulator.

However, if the circuit is designed so as to be switched off right after the detection signal is output, electric supply to the load regulator may be stopped by a very short pulse (such as noise) that is perceived as the detection signal. This results in error operations. To avoid occurrence of error operations, the switch is opened based on the detection of the abnormal condition only if output of the detection signal continues over a prescribed period of time. This prescribed time period is called a "delay time". Different delay times are arranged depending on the types of abnormal conditions detected. For instance, delay time is shortened for more serious conditions or matters of urgency, while delay time is prolonged for minor abnormal conditions. To be more precise, delay time for protection from overcharge is about a second, delay time for protection from over discharge is about 20 ms, delay time for protection from excessive discharge current is about 12 ms, delay time for protection from excessive charging current is about 16 ms, and delay time for protection from short-circuit current is about 0.4 ms. These delay times, however, cause inspection time to be increased in characteristic inspection or shipping inspection of the protection IC, and lead to fall of mass productivity and increase of the cost.

Because in the conventional protection IC delay time is determined by the capacitances of external capacitors, it can be shortened during the inspection by reducing the capacitance of the external capacitors. However, in response to increased demand for size reduction and cost reduction of the device, the circuit design has been changed so as to incorporate an oscillator and counters into the protection IC to produce delay times, instead of using external capacitors. For this reason, test terminals for reducing or adjusting the delay times are also added to the protection IC, in place of adjustment of the capacitances of the external capacitors.

Since the protection IC is accommodated in a battery pack, miniaturization of the device (circuit) is indispensable. Addition of a single pin of the test terminal may cause the package to be replaced with a larger-size package, or cause the number of bonding pads of the test terminal to increase. As a result, the IC chip size, the required space, and the cost increase.

Japanese Laid-open Patent Publication No. 2005-12852 proposes a structure for overcoming the above-described problem, which structure is illustrated in FIG. 1. A battery pack 120 includes a protection IC 101, a rechargeable (secondary) cell 21, a discharge-control NMOS transistor M21, a charging-control NMOS transistor M22, a capacitor C21, resistors R21 and R22, and positive and negative terminals 22 and 23. A battery charger or load regulator 30 is connected to the positive and negative terminals 22 and 23. The protection IC 101 has an electric current detection terminal V– for detecting excessive charging current or excessive discharge current. The electric potential or the voltage of the electric current detection terminal V– with respect to terminal Vss is positive in electric discharge, and negative in electric charging.

In this publication, a function for reducing delay time when a negative voltage lower than the ordinary negative potential due to typical excessive charging current is applied to the electric current detection terminal V– is employed. With this structure, conventional test terminals in place of external capacitors are eliminated to maintain the package size and the chip size small.

However, in order to achieve more secure and reliable protection of the rechargeable cell in the battery pack 120, demand for more sophisticated control for protecting the secondary cell from excessive discharge current has occurred these days. For example, delay time up to actual switching-off operations should be adjusted more finely according to the amount of discharge current. For instance, the switch is opened after 10 ms delay time when the voltage at the electric current detection terminal V– becomes 0.1 V or higher, after 2 ms delay time when the V– become 0.5 V or higher, and after 0.4 ms delay time when V– reaches 0.8 V or higher. In this manner, several levels of electric potential to be detected at the electric current detection terminal V– are provided, and different delay times are selected according to the detected voltage levels. This arrangement inevitably causes the area size of the IC chip and the cost to be increased.

SUMMARY

In an aspect of this disclosure, there is provided a semiconductor device for protecting a rechargeable cell that can deal with different levels of excessive discharge currents without increasing the area size of the IC chip.

According to a preferred embodiment, a delay circuit for delaying the switching-off operation by a prescribed delay time determined for each of multiple excessive discharge current detection circuits, and a delay reducing circuit for adjusting (or shortening) at least one of the delay times produced by the delaying circuit at a prescribed ratio, are employed.

In one aspect of this disclosure, a semiconductor device for protecting a rechargeable cell at least from excessive discharge current due to over discharge of the rechargeable cell is provided. The semiconductor device includes:

(a) a first excessive discharge current detection circuit configured to detect first excess of a voltage at an externally or an internally provided electric current detection terminal exceeding a first voltage level (Vs3), the electric current detection terminal converting a discharge current to a positive voltage with respect to ground potential;

(b) a second excessive discharge current detection circuit configured to detect second excess of the absolute voltage at the electric current detection terminal exceeding a second voltage level (Vs4) higher than the first voltage level;

(c) a delay circuit configured to cause each of the first and second excessive discharge current detection circuits to delay its output by a predetermined delay time; and (d) a delay reducing circuit configured to produce a delay time reducing signal for reducing the delay time at a predetermined ratio when a negative voltage lower than a predetermined negative voltage level or a positive voltage higher than a third voltage level (Vt) is applied to the electric current detection terminal.

With this arrangement, each signal output from the first and second excessive discharge current detection circuits is delayed by a certain delay time produced by the delay circuit. This delay time can be adjusted or reduced at a predetermined ratio based on the delay time reducing signal, which signal is generated when a prescribed condition is satisfied. This arrangement can deal with different levels of excessive discharge currents without increasing the area size of the IC chip.

In a preferred example, upon receiving the delay time reducing signal, the delay circuit changes the delay times at a different reducing ratio depending on whether the operation is in a recharging mode or a discharging mode.

For example, the reducing ratio is set to 1/40 of the predetermined delay time in the charging mode, and to 1/5 of the predetermined delay time in the discharging mode because the predetermined delay time for the detection of the excessive charging current is 1-second long.

In a preferred example, the third voltage level (Vt) is higher than the first voltage level (Vs3) and is lower than the second voltage level (Vs4). Alternatively, the third voltage level (Vt) may be set higher than the second voltage level (Vs4).

In a preferred example, the delay reducing circuit includes a first inverter of a CMOS structure with a negative power-source terminal connected to the electric current detection terminal and an input terminal connected to the ground potential or a predetermined potential, a second inverter of a CMOS structure with a negative power-source terminal connected to the electric current detection terminal and an input terminal connected to the output of the first inverter, and a third inverter of CMOS structure with an input terminal connected to the output of the second inverter.

The first through third inverters may be serially connected. The output level of the delay reducing circuit is high or low, depending on whether the potential level at the electric current detection terminal is at or near the ground potential, or below the ground potential.

In a preferred example, the predetermined negative level used for comparison of the voltage applied to the electric current detection terminal is determined by the threshold voltage of the NMOS transistor of the first inverter, whose gate is connected to the input terminal of the first inverter, during the fabrication process. The positive voltage level higher than the third voltage level is determined by the threshold voltage of the NMOS transistor of the third inverter, whose gate is connected to the input terminal of the third inverter, during the fabrication process.

The voltage level of the electric current detection terminal used for comparison when a delay time reducing signal is produced by the delay reducing circuit can be determined by the NMOS transistor of the first or third inverter. To determine the predetermined negative voltage level, the threshold voltage of the NMOS transistor of the first inverter is adjusted in the CMOS fabrication process. To determine the positive voltage level, the threshold voltage of the NMOS transistor of the third inverter is adjusted in the CMOS fabrication process.

In a preferred example, the first inverter has a hysteresis characteristic.

If the delay reducing circuit operates too sensitively, the probability of error operations caused by very brief noise or jitter increases. This can be prevented by providing the first inverter with the hysteresis characteristic. With the hysteresis characteristic, noise with a very short pulse width or jitter can be prevented by setting the input voltage of the rising edge and the input voltage of the falling edge different from each other.

BRIEF DESCRIPTION OF THE DRAWINGS

Other aspects, features, and advantages will become more apparent from the following detailed description when read in conjunction with the accompanying drawings, in which.

DETANED DESCRIPTION OF THE PREFERRED EMBODIMENTS

The preferred embodiment of the present invention is described below in conjunction with the attached drawings. The components described in the embodiment, types, combinations, shapes and the positional relationship thereof are used only for the exemplified purpose, and the invention is not limited to these examples.

Figure 1:
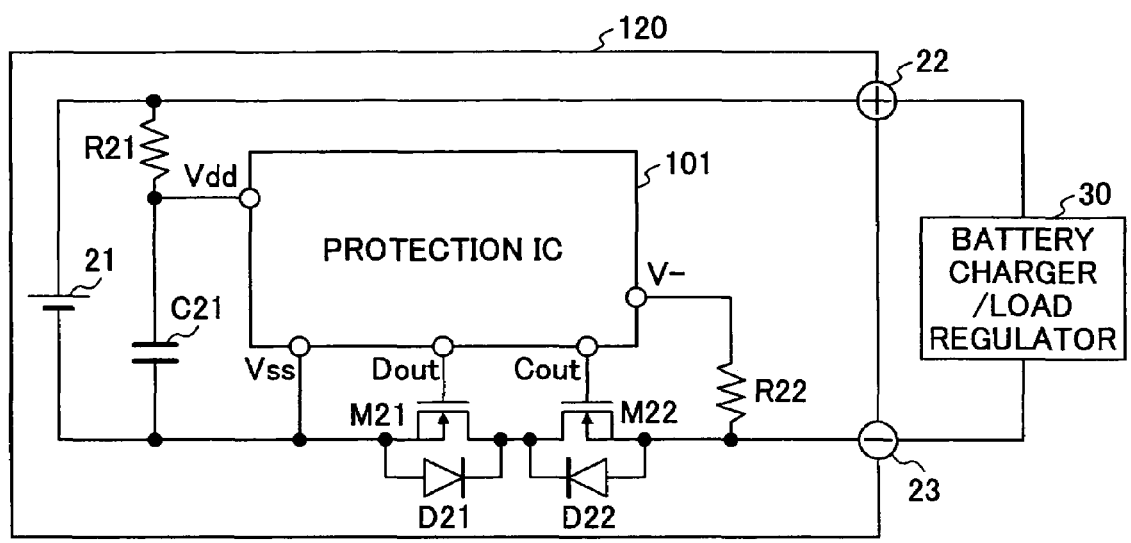
FIG. 1 is a block diagram of a conventional battery pack.
Figure 2:
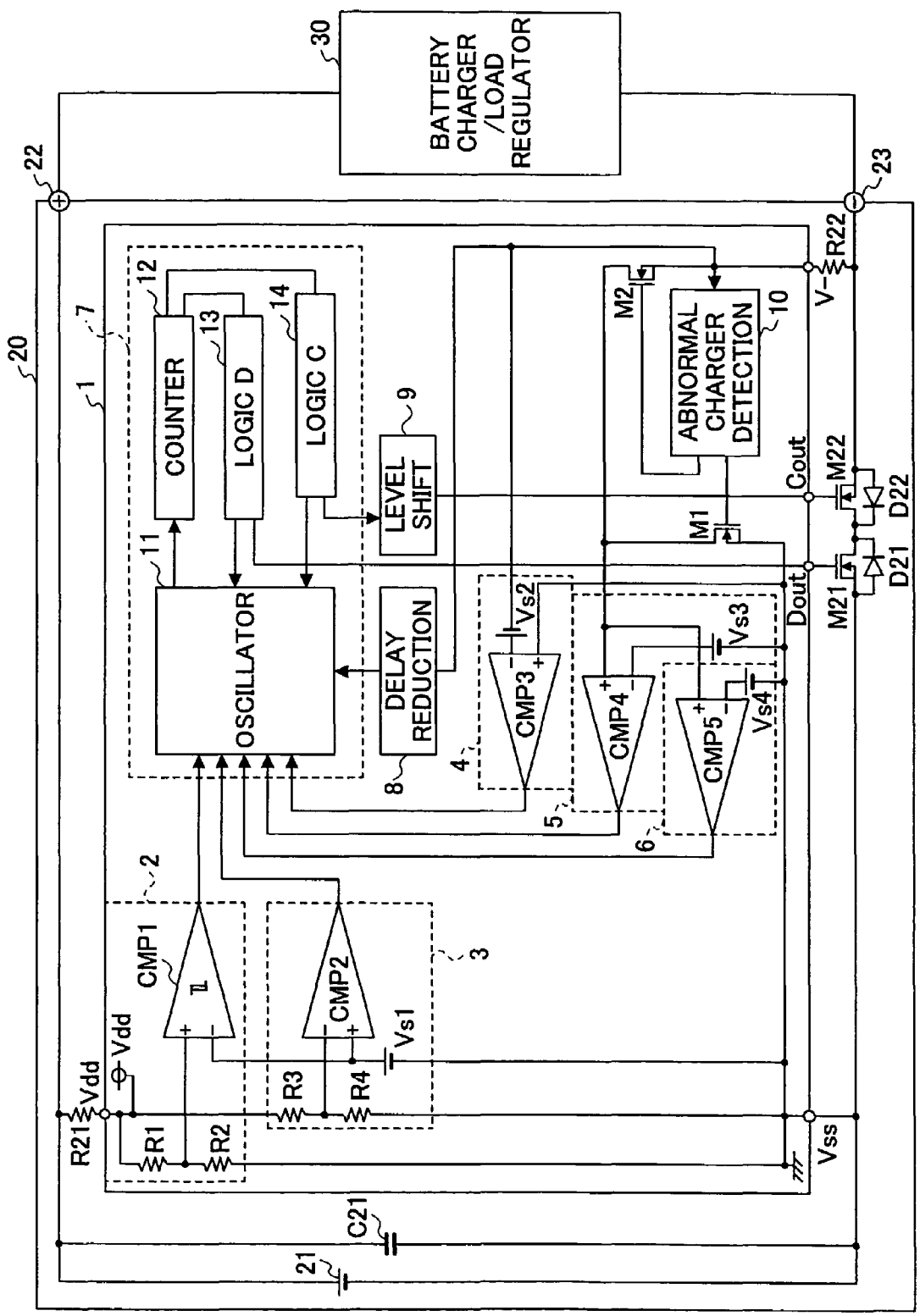
FIG. 2 is a circuit diagram of a battery pack according to an embodiment of the invention.

FIG. 2 is a circuit diagram of a battery pack according to an embodiment of the invention. The battery pack 20 includes a protection IC (or a semiconductor device for rechargeable cell protection) 1, a rechargeable (secondary) cell 21, a discharge-control NMOS transistor M21, a charging-control NMOS transistor M22, a capacitor C21, and resistors R21 and R22. The battery pack 20 also has a positive terminal 22 and a negative terminal 23, which terminals are electrically connected to a battery charger or load regulator 30.

The protection IC 1 includes an overcharge detection circuit 2, an over discharge detection circuit 3, an excessive charging current detection circuit 4, a first excessive discharge current detection circuit 5, a second excessive discharge current detection circuit 6, a delay circuit 7, a delay reducing circuit 8, a level shifter 9, an abnormal charger detection circuit 10, and NMOS transistors M1 and M2. The protection IC 1 also has a discharge-control terminal Dout for controlling the discharge-control NMOS transistor M21, a charging-control terminal Cout for controlling the charging-control NMOS transistor M22, and a electric current detection terminal V− for converting the charging/discharge current into a voltage to detect excessive charging or discharge current.

As to the protection specification against electric discharge, the protection IC 1 has an excessive discharge current detected at delay time of 10 ms when the voltage at the electric current detection terminal V− exceeds 0.1 V, an excessive discharge current detected at delay time of 2 ms when the voltage at the electric current detection terminal V− exceeds 0.5 V, and a short-circuit detection current detected at delay time of 0.4 ms when the voltage at the electric current detection terminal V− exceeds 0.8 V. These reference voltages and delay times are only examples of the device parameters, and different values may be used. In general, as the voltage increases, the delay time is set shorter.

The overcharge detection circuit 2 has a comparator CMP1 furnished with a hysteresis characteristic, and serially connected resistors R1 and R2. The inverted input of the comparator CMP1 is connected to voltage Vs1, and the non-inverted input is connected to the connection node between the resistors R1 and R2. The serially connected resistors R1 and R2 are inserted between the power-source voltage Vdd and the ground potential Vss.

If the voltage of the rechargeable cell 21 rises along with electric charging, and if the voltage at the connection node between resistors R1 and R2 exceeds Vs1, then the rechargeable cell 21 is in the overcharged state. In this case, the comparator CMP1 outputs a high-level signal when the connection node voltage between R1 and R2 exceeds Vs1, which output signal is supplied to the delay circuit 7.

The over discharge detection circuit 3 includes a comparator CMP2, a voltage Vs1, and serially connected resistors R3 and R4. The non-inverted input of the comparator CMP2 is connected to the voltage Vs1. The serially connected resistors R3 and R4 are inserted between the power-source voltage Vdd and the ground potential Vss.

When the voltage of the rechargeable cell 21 falls due to electric discharge, and when the voltage at the connection node between the resistors R3 and R4 becomes less than the voltage Vs1, then the rechargeable cell 21 is in the over discharge state. Accordingly, the comparator CMP2 outputs a high-level signal when the connection node voltage between resistors R3 and R4 becomes lower than voltage Vs1. This high-level signal is supplied to the delay circuit 7.

The excessive charging current detection circuit 4 includes a comparator CMP3 and a voltage Vs2. The inverted input of the comparator CMP3 is connected to the positive potential of voltage Vs2, and the non-inverted input is grounded. The negative potential of voltage Vs2 is connected to electric current detection terminal V−.

At an ordinary charging current level, the voltage at the electric current detection terminal V− is negative with respect to the ground potential Vss, and besides, the absolute value of the voltage is smaller than Vs2. Accordingly, the output level of the comparator CMP3 is low. If, however, the absolute-value voltage of the current detection circuit V− with respect to the ground potential Vss becomes Vs2 or higher due to occurrence of abnormal situations or increase of charging current, the potential level of the inverted input to the comparator CMP3 falls to or below ground potential Vss. Consequently, the output level of the comparator CMP3 turns to a high level. This inverted (high-level) output is supplied to the delay circuit 7.

The first excessive discharge current detection circuit 5 includes a comparator CMP4 and a voltage Vs3. The inverted input of the comparator CMP4 is connected to the positive potential of Vs3, and the non-inverted input is connected via the NMOS transistor M2 to the electric current detection terminal V−. The negative potential of Vs3 is grounded.

At an ordinary discharge current level, the voltage at electric current detection terminal V− with respect to the ground potential Vss is lower than Vs3, and accordingly, the output level of comparator CMP4 is low. If, however, the voltage of the current detection circuit V− becomes Vs3 or higher due to occurrence of abnormal situations or increase of discharge current, the output level of the comparator CMP4 turns to a high level. This inverted (high-level) output is supplied to the delay circuit 7.

The second excessive discharge current detection circuit 6 includes a comparator CMP5 and a voltage Vs4. The inverted input of the comparator CMP5 is connected to the positive potential of Vs4, and the non-inverted input is connected via the NMOS transistor M2 to the electric current detection terminal V−. The negative potential of Vs4 is grounded.

At an ordinary discharge current level, the voltage at electric current detection terminal V− with respect to the ground potential Vss is lower than Vs4, and accordingly, the output level of comparator CMP5 is low. If, however, the voltage of the current detection circuit V− becomes Vs4 or higher due to occurrence of abnormal situations or increase of discharge current, the output level of the comparator CMP5 turns to a high level. This inverted (high-level) output is supplied to the delay circuit 7.

The delay circuit 7 includes an oscillation circuit 11, a counter circuit 12, a logic circuit (D) 13, and another logic circuit (C) 14.

The input of the oscillation circuit 11 is connected to the outputs of the detection circuits 2 though 6. The oscillation circuit also receives a delay time reducing signal from the delay reducing circuit 8, which circuit will be described in more detail below, and output signals from the logic circuits 13 and 14, respectively.

When the output signals from the detection circuits are received at the oscillation circuit 11, the clock signal generated by the oscillation circuit 11 is divided by the counter circuit 12, and delay time defined in advance for each of the detection circuits is produced. The detection signals delayed by the counter circuit 12 are supplied to logic circuit (D) 13 or logic circuit (C) 14.

In electric discharge, the logic circuit (D) 13 outputs a low-level signal, which signal switches off the NMOS transistor M21 arranged outside the protection IC 1 to disconnect the rechargeable cell 21 from the battery charger/load regulator 30.

In electric charging, the logic circuit (C) 14 outputs a low-level signal, which signal switches off the NMOS transistor M22 arranged outside the protection IC 1 to disconnect the rechargeable cell 21 from the battery charger/load regulator 30.

Upon receiving a delay time reducing signal from the delay reducing circuit 8, the oscillation circuit 11 reduces all the delay times set for the detection circuits. For example, if the delay times are reduced to 1/40, 1-second delay time after detection of overcharge can be reduced to 25 ms.

In addition, because whether the current operation is in the charging mode or discharge mode can be determined based on the output signal from the logic circuit (D) 13 and the logic circuit (C) 14, the reducing ratio can be varied depending on the operation mode during which the delay time reducing signal is received (i.e., depending on whether the delay time reducing signal is received during the discharge operation or the charging operation). For example, in electric charging, the delay time may be reduced to 1/40 because the delay time for overcharge detection is as long as 1 second, while in discharge the delay time may be reduced to 1/5.

The delay reducing circuit 8 produces a delay time reducing signal when the voltage at the electric current detection terminal V− falls to a predetermined negative voltage with respect to the ground potential Vss and when it rises up to a predetermined positive voltage with respect to the ground potential Vss. The generated delay time reducing signal is supplied to the oscillation circuit 11. More details about the delay reducing circuit 8 will be described below.

The level shifter 9 shifts the signal level so as to control the NMOS transistor M22 using the output signal from the logic circuit (C) 14.

When the high-output battery charger 30 is erroneously connected, the abnormal charger detection circuit 10 turns off the NMOS transistors M1 and M2 for protection purposes to prevent a high voltage from being applied via the electric current detection terminal V− to the comparator CMP4 and CMP5.

Figure 3:
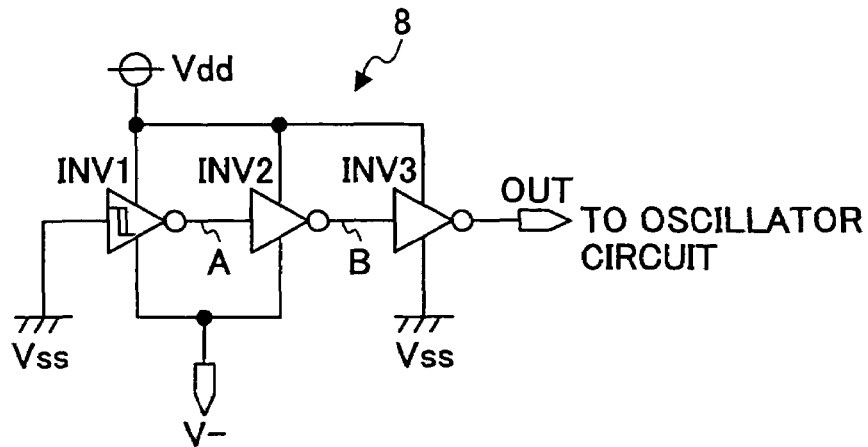
FIG. 3 is a circuit diagram of the delay reducing circuit according to an embodiment of the invention.

FIG. 3 is a circuit diagram of the delay reducing circuit 8 according to an embodiment. The delay reducing circuit 8 includes three CMOS-based inverters. First inverter INV1 has a hysteresis characteristic. The negative power-source terminal of the inverter INV1 is connected to electric current detection terminal V−, and the input terminal is grounded. The output of the first inverter INV1 is connected to the input of the second inverter INV2. The negative power-source terminal of the second inverter INV2 is also connected to the electric current detection terminal V−. The output of the second inverter INV2 is connected to the input of the third inverter INV3, and the negative power-source terminal of INV3 is grounded.

In operation, when the potential of the electric current detection terminal V− is close to the ground potential Vss, the output A of the first inverter INV1 is a high-level signal. Because this high-level signal is inverted by the inverters INV2 and INV3, successively, the final output level of the delay reducing circuit 8 becomes high. When the potential of the electric current detection terminal V− falls below the ground potential Vss and reaches at or below a predetermined negative voltage, then the output A of the first inverter INV1 is inverted and a low-level signal is output. Because this low-level signal is inverted by the inverters INV2 and INV3, successively, the final output level of the delay reducing circuit 8 becomes low. When the output signal OUT of the delay reducing circuit 8 becomes low, the oscillation circuit 11 reduces the delay time at a predetermined ratio.

It is in the charging period that the voltage at the electric current detection terminal V− becomes negative with respect to the ground potential Vss. Accordingly, if the detection voltage for detecting the excessive charging current is −0.1 V, the predetermined negative voltage with respect to the ground potential is selected so as to be sufficiently lower than −0.1 V and it may be set to −2 V, which voltage never occurs during ordinary operation.

For the inspection of the protection IC, a voltage lower than −2V (never occurring in ordinary operation) is applied to the electric current detection terminal V− from an external voltage source. Then, the output of the first inverter INV1 turns to a low level, and the delay reducing circuit 8 can output a low-level delay signal only in the inspection process. With this arrangement, the delay time can be reduced during the inspection. Although in the embodiment the input terminal of the first inverter INV1 is connected to the ground potential Vss, the embodiment is not limited to this example. The input of INV1 may be connected to any other potential as long as a predetermined voltage difference from the electric current detection terminal V− can be obtained.

Figure 4:
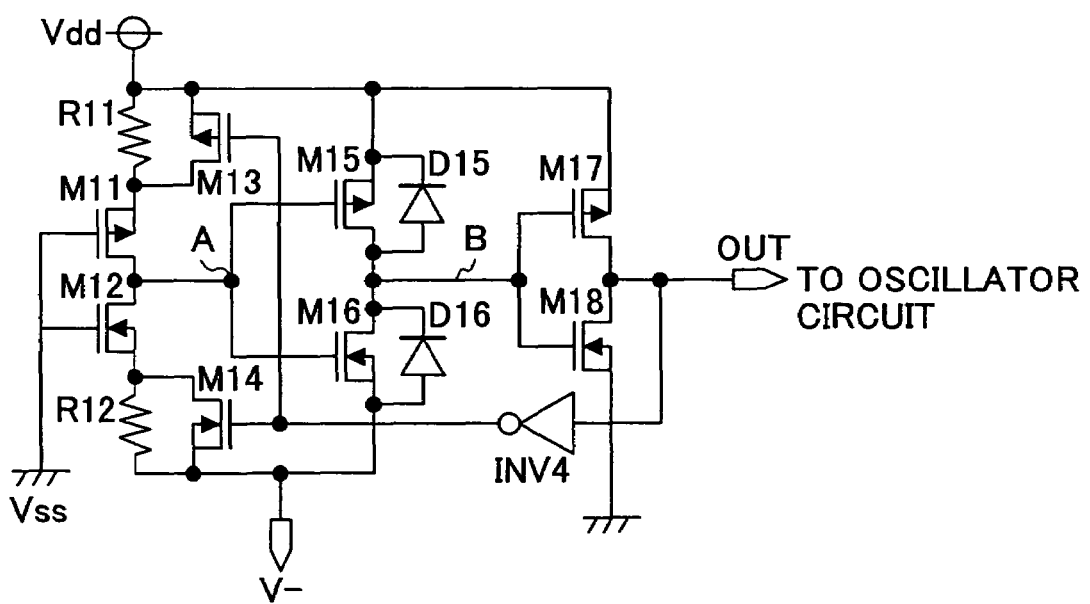
FIG. 4 illustrates a detailed structure of the delay reducing circuit.

FIG. 4 is a detailed circuit diagram of the delay reducing circuit 8 shown in FIG. 3. The first inverter INV1 includes PMOS transistors M11 and M13, NMOS transistors M12 and M14, and resistors R11 and R12.

The source of the PMOS transistor M11 is connected via the resistor R11 to the power-source voltage Vdd, the drain of M11 is connected to the drain of the NMOS transistor M12, and the gate of M11 and the gate of the NMOS transistor M12 are connected in common to a predetermined potential (to the ground potential Vss in this example). The source of the NMOS transistor M12 is connected via the resistor R12 to the electric current detection terminal V−.

PMOS transistor M13 is connected in parallel to resistor R11, and its gate is connected in common with the gate of NMOS transistor M14 to the output of inverter INV4. The NMOS transistor M14 is connected in parallel to resistor R12. The PMOS transistor M11 and the NMOS transistor M12 define the major part of the first inverter INV1. The PMOS transistor M12, NMOS transistor M14, and resistors R11 and R12 provide the hysteresis characteristic to the input to the inverter.

The second inverter INV2 includes a PMOS transistor M15, an NMOS transistor M16, and diodes D15 and D16. The diodes D15 and D16 are parasitic diodes, each connected between the source and the drain of the associated one of the PMOS transistor M15 and the NMOS transistor M16. The source of the PMOS transistor M15 is connected to the power-source voltage Vdd, the drain is connected to the drain of the NMOS transistor M16, and the gate is connected in common with the gate of NMOS transistor M16 to the output A of the first inverter INV1. The anode of the diode D15 is connected to the source of PMOS transistor M15, and the cathode is connected to the output B of the second inverter INV2. The anode of diode D16 is connected to the output B of the second inverter INV2 and the cathode is connected to the source of NMOS transistor M16.

The third inverter INV3 includes a PMOS transistor M17 and an NMOS transistor M18. The source of the PMOS transistor M17 is connected to the power-source voltage Vdd, and the drain is connected to the drain of NMOS transistor M18. The source of NMOS transistor M18 is grounded. The gates of these two transistors are connected in common to the output B of the second inverter INV2. The drains of these transistors M17 and M18 are connected to the output "OUT" of the delay reducing circuit 8.

Although not illustrated in FIG. 3, the output "OUT" of the delay reducing circuit 8 is fed via the inverter INV4 back to the gates of the PMOS transistor M13 and the NMOS transistor M14 to produce the hysteresis characteristic.

If the potential of the electric current detection terminal V− is close to the ground potential Vss, the NMOS transistor M12 is switched off, while the PMOS transistor M11 is turned on, and therefore, the output A of the first inverter INV1 becomes a high level. This high-level signal is inverted by the inverters INV2 and INV3, successively, and the final output level of the delay reducing circuit 8 is high.

If the voltage of the electric current detection terminal V− falls to or below the threshold voltage of the NMOS transistor M12, the NMOS transistor M12 is switched on and the output of the first inverter INV1 turns to the low level. By setting the inspection voltage applied to the electric current detection terminal V− in the inspection mode to the threshold voltage of the NMOS transistor M12, the delay circuit 8 is enabled to produce a delay time reducing signal.

When the voltage of the electric current detection terminal V− rises up to or above the ground potential Vss, it causes the output voltage B of the second inverter INV2, which voltage is currently at a low level, to increase via the parasitic diode D16. When the output voltage B of the second inverter INV2 exceeds the threshold voltage of the NMOS transistor M18, the NMOS transistor M18 is switched on and the output of the third inverter INV3 turns to a low level. This output signal is supplied as the output "OUT" of the delay reducing circuit 8 to the oscillation circuit 11. Consequently, the delay circuit 7 reduces the delay time.

In this manner, the delay reducing circuit 8 can output a delay time reducing signal even when the potential of the electric current detection terminal V− is positive.

The positive reference voltage Vt of the electric current detection terminal V− used to cause the delay reducing circuit 8 to output the delay time reducing signal may be set higher than the detection voltage Vs3 of the first excessive discharge current detection circuit 5, and lower than the detection voltage Vs4 of the second excessive discharge current detection circuit 6 (Vs3<Vt<Vs4). For instance, Vs3 is 0.1 V, Vt is 0.5 V, and Vs4 is 0.8 V.

In order to allow the first excessive discharge current detection circuit 5 to operate, Vt has to be set higher than Vs3; however, Vt is also the reference voltage for the comparison at the second excessive discharge current detection circuit 6. According, to prevent the first and second excessive discharge current detection circuits 5 and 6 from operating simultaneously, the reference voltage Vs4 of the second excessive discharge current detection circuit 6 has to be higher than Vt at which voltage level the first excessive discharge current detection circuit 5 is operating.

When the voltage at the electric current detection terminal V− reaches at or above 0.5 V, a detection signal has already been output from the first excessive discharge current detection circuit 5 and delay time of 10 ms has already been started. Since in this case a delay time reducing signal has been output from the delay reducing circuit 8, the delay circuit 7 can produce delay time of 2 ms under the delay reducing ratio of 1/5 determined in advance for the discharge mode, without requiring another delay time of 2 ms to be added for the positive voltage level of 0.5 V. Concerning delay time of 0.4 ms for 0.8 V (Vs4), it is of no concern as long as the circuit is designed so as to produce the delay time under the reduced delay time.

Alternatively, the positive voltage Vt at the electric current detection terminal for causing the delay reducing circuit 8 to output the delay time reducing signal may be set higher than the detection voltage Vs4 of the second excessive discharge current detection circuit 6. In this case, for example, voltage parameters may be Vs3=0.1 V, Vs4=0.5 V, and Vt=0.8 V.

If the voltage at the electric current detection terminal V− reaches at or above 0.8 V, detection signals will have already been output from the first and second excessive discharge current detection circuits 5 and 6 and delay time of 2 ms will have already been started. Because in this case a delay time reducing signal has been output from the delay reducing circuit 8, the delay circuit 7 can produce delay time of 0.4 ms under the delay reducing ratio of 1/5 determined in advance for the discharge mode, without requiring another delay time of 0.4 ms to be added for the positive voltage level of 0.8 V.

The negative voltage at the electric current detection terminal V− for causing the delay reducing circuit 8 to output the delay time reducing signal can be set by the threshold voltage of the NMOS transistor M12 used in the first inverter INV1. The positive voltage can be adjusted by changing the threshold voltage of the NMOS transistor M18 used in the third inverter INV3. The threshold voltage of the NMOS transistor can be changed by adjusting the transistor fabrication process.

The delay reducing circuit 8 is conventionally designed so as to detect application of a negative voltage to the electric current detection terminal V− to shorten the delay time. In contrast, in the embodiment, the delay reducing circuit 8 is capable of outputting the delay time reducing signal upon detection of not only a negative voltage, but also a positive voltage, applied to the electric current detection terminal V−. Accordingly, the number of detection levels for detecting excessive discharge current can be increased without adding an extra circuit.

In addition, the detection voltage level can be controlled by the threshold voltage of the NMOS transistor used in the inverter simply by adjusting the transistor fabrication process without adding an extra circuit or causing undesirable cost-increase.

With the above-described structure, the delay circuit produces a delay time determined in advance for each of the detection circuits, and such a delay time can be reduced at a certain ratio by the delay reducing circuit. Consequently, a protection IC is provided that can deal with different levels of excessive discharge current without expanding the IC chip area.

Because the delay time reducing ratio can be changed depending on the operating mode (the discharge mode or the charging mode) in which the delay time reducing signal is received, the optimum delay time can be set for each of the discharge mode and the charging mode.

By setting the positive reference voltage at the electric current determination terminal V− between Vs3 of the first excessive discharge current detection circuit 5 and Vs4 of the second excessive discharge current detection circuit 6, simultaneous operation of these two detection circuits can be avoided.

When the positive reference voltage is set higher than Vs4 (which voltage is greater than Vs3), different levels of excessive discharge current can be detected using a common voltage Vt.

By forming the delay reducing circuit with three serially connected inverters, an additional level of excessive discharge current can be detected and a new delay time corresponding to the detected level can be established.

The negative reference voltage at the electric current determination terminal V− can be changed by adjusting the threshold voltage of the NMOS transistor whose gate is connected to the input terminal of the first inverter in the fabrication process. The positive reference voltage can be changed by adjusting the threshold voltage of the NMOS transistor whose gate is connected to the input terminal of the third inverter in the fabrication process. Accordingly, no additional circuit is required.

By providing the hysteresis characteristic to the first inverter, jitter can be prevented when a voltage is detected.

This patent application is based on and claims the benefit of the earlier filing date of Japanese Patent Application No. 2005-230151 filed Aug. 8, 2005, the entire contents of which are hereby incorporated by reference.

What is claimed is:

1. A semiconductor device for protecting a rechargeable cell at least from excessive discharge current due to over discharge of the rechargeable cell, the semiconductor device comprising:

a first excessive discharge current detection circuit configured to detect first excess of a voltage at an electric current detection terminal exceeding a first voltage level, the electric current detection terminal converting a discharge current to a positive voltage with respect to a ground potential;

a second excessive discharge current detection circuit configured to detect second excess of an absolute voltage at the electric current detection terminal exceeding a second voltage level higher than the first voltage level;

a delay circuit configured to delay output of each of the first and second excessive discharge current detection circuits by a corresponding delay time; and a delay reducing circuit configured to reduce the delay time by a predetermined ratio by generating a delay time reducing signal in response to a detection of a condition that a negative voltage lower than a predetermined negative voltage level or a positive voltage higher than a third voltage level is applied to the electric current detection terminal, and to maintain the delay time without any change, in a case of absence of the detection of the condition, wherein upon receiving the delay time reducing signal, the delay circuit changes the delay time by a first reducing ratio in a recharging mode, and changes the delay time by a second reducing ratio in a discharging mode, the first reducing ratio being different from the second reducing ratio.

2. The semiconductor device of claim 1, wherein the third voltage level is higher than the first voltage level and is lower than the second voltage level.

3. The semiconductor device of claim 1, wherein the third voltage level is set higher than the second voltage level.

4. The semiconductor device of claim 1, wherein the delay reducing circuit includes:

a first inverter of a CMOS structure with a negative power-source terminal connected to the electric current detection terminal and an input terminal connected to the ground potential or a predetermined potential;

a second inverter of a CMOS structure with a negative power-source terminal connected to the electric current detection terminal and an input terminal connected to the output of the first inverter; and a third inverter of CMOS structure with an input terminal connected to the output of the second inverter.

5. The semiconductor device of claim 4, wherein the predetermined negative voltage level is determined by the threshold voltage of the NMOS transistor of the first inverter, whose gate is connected to the input terminal of the first inverter, during the fabrication process.

6. The semiconductor device of claim 4, wherein the positive voltage level higher than the third voltage level is determined by the threshold voltage of the NMOS transistor of the third inverter, whose gate is connected to the input terminal of the third inverter, during the fabrication process.

7. The semiconductor device of claim 4, wherein the first inverter has a hysteresis characteristic.

8. The semiconductor device of claim 1, wherein the delay reducing circuit produce the delay time reducing signal for reducing the delay time at the predetermined ratio in each instance when the negative voltage lower than the predetermined negative voltage level is applied to the electric current detection terminal and in each instance when the positive voltage higher than the third voltage level is applied to the electric current detection terminal.

* * * * *